United States Patent
Dange (10) Patent No.: US 12,124,549 B2
(45) Date of Patent: Oct. 22, 2024

(54) SYSTEM AND METHOD FOR GRANTING ROLE-BASED ACCESS TO A DIGITAL ARTIFACT

(71) Applicant: Amod Ashok Dange, Mountain View, CA (US)

(72) Inventor: Amod Ashok Dange, Mountain View, CA (US)

(73) Assignee: Amod Ashok Dange, Mountain View, CA (US)

( * ) Notice: Subject to any disclaimer, the term of this patent is extended or adjusted under 35 U.S.C. 154(b) by 201 days.

(21) Appl. No.: 17/847,768

(22) Filed: Jun. 23, 2022

(65) Prior Publication Data

US 2023/0214464 A1 Jul. 6, 2023

Related U.S. Application Data (60) Provisional application No. 63/295,812, filed on Dec. 31, 2021.

(51) Int. Cl.
*G06F 21/32* (2013.01)
*G06F 21/10* (2013.01)
(Continued)

(52) U.S. Cl.
CPC .......... *G06F 21/32* (2013.01); *G06F 21/1015* (2023.08); *G06F 21/106* (2023.08);
(Continued)

(58) Field of Classification Search
CPC .... G06F 21/32; G06F 21/602; G06F 21/6209; G06F 21/6245; G06F 21/6281;
(Continued)

(56) References Cited

U.S. PATENT DOCUMENTS 6,185,684 B1 * 2/2001 Pravetz ............... G06F 21/6209
713/168
6,748,366 B1 6/2004 Hurwitz et al.
(Continued)

FOREIGN PATENT DOCUMENTS

WO 0135348 A1 5/2001
WO 2015183783 A1 12/2015

OTHER PUBLICATIONS

Anonymous, "Distributed Global People Registry", Technical Disclosure Commons, (Jun. 18, 2019) https://www.tdcommons.org/dpubs_series/2286. (Year: 2019).*
(Continued)

*Primary Examiner* — Michael Simitoski
(74) *Attorney, Agent, or Firm* — Shumaker, Loop & Kendrick, LLP (57) ABSTRACT

A system and method for immutably affixing one or more Unique-Numbers (N1-Nn) associated with one or more users and one or more roles (R1-Rn) associated with each user from the one or more users to a digital artifact (A1), rendering the digital artifact (A1) in a client application (C1), and provisioning the one or more users with role-based access to the digital artifact (A1). The method includes steps for registering a set of users by capturing biometric samples associated with each user from the set of users. Further, the method includes steps for immutably affixing one or more Unique-Numbers (N1-Nn) associated with one or more users and one or more roles (R1-Rn) associated with each user from the one or more users to a digital artifact (A1). Further, the method includes steps for provisioning a target user ($U1_t$) with role-based access to the digital artifact (A1).

12 Claims, 6 Drawing Sheets

(51) Int. Cl.
   *G06F 21/60*   (2013.01)
   *G06F 21/62*   (2013.01)
   *G06F 21/64*   (2013.01)
   *H04L 9/08*    (2006.01)

(52) U.S. Cl.
   CPC ........ *G06F 21/602* (2013.01); *G06F 21/6218* (2013.01); *G06F 21/6245* (2013.01); *G06F 21/6281* (2013.01); *G06F 21/64* (2013.01); *H04L 9/0866* (2013.01)

(58) Field of Classification Search
   CPC ... H04L 9/0825; H04L 9/0866; H04L 9/0894; H04L 9/3231
   See application file for complete search history.

(56) References Cited

U.S. PATENT DOCUMENTS

| | | | |
|---|---|---|---|
| 8,805,747 | B2 | 8/2014 | Zimberoff et al. |
| 8,812,373 | B2 | 8/2014 | Johnson |
| 8,995,665 | B1* | 3/2015 | Tsaur ............... H04L 9/0825 380/277 |
| 11,010,655 | B1 | 5/2021 | Kushner |
| 2001/0044785 | A1 | 11/2001 | Stolfo et al. |
| 2002/0013739 | A1 | 1/2002 | O'Donnell et al. |
| 2003/0208411 | A1 | 11/2003 | Estes et al. |
| 2004/0128524 | A1 | 7/2004 | Ezaki |
| 2004/0254893 | A1 | 12/2004 | Tsuei et al. |
| 2005/0283608 | A1* | 12/2005 | Halcrow ............ H04L 63/0823 713/175 |
| 2009/0292930 | A1* | 11/2009 | Marano ............... G06F 21/6218 726/28 |
| 2010/0230328 | A1 | 9/2010 | Bonnell et al. |
| 2012/0143709 | A1 | 6/2012 | Shakes |
| 2014/0117076 | A1 | 5/2014 | Eberlein |
| 2016/0099949 | A1* | 4/2016 | Leondires .......... G06F 21/6218 726/28 |
| 2017/0083802 | A1 | 3/2017 | Chen et al. |
| 2018/0101691 | A1* | 4/2018 | Das .................... G06F 21/6209 |
| 2019/0005258 | A1* | 1/2019 | Signäs ................. H04L 9/3226 |
| 2019/0318382 | A1 | 10/2019 | Yang et al. |
| 2021/0034773 | A1* | 2/2021 | Rajput ................ H04L 9/0825 |
| 2021/0065099 | A1 | 3/2021 | Dixon, Jr. et al. |
| 2021/0091937 | A1* | 3/2021 | Dange ..................... H04L 9/30 |
| 2021/0142276 | A1 | 5/2021 | Gupte |
| 2021/0142321 | A1 | 5/2021 | Kaczmarek et al. |
| 2021/0192073 | A1 | 6/2021 | Goodsitt et al. |
| 2022/0069991 | A1* | 3/2022 | Herder, III ............ H04L 63/061 |
| 2022/0108266 | A1 | 4/2022 | Smith et al. |
| 2023/0059581 | A1 | 2/2023 | Sankaran et al. |
| 2023/0145741 | A1 | 5/2023 | Santosh et al. |

OTHER PUBLICATIONS

Y. Chung, K. Moon and H.-W. Lee, "Biometric Certificate Based Biometric Digital Key Generation with Protection Mechanism," 2007 Frontiers in the Convergence of Bioscience and Information Technologies, Jeju, Korea (South), 2007, pp. 709-714. (Year: 2007).*

Suresh, K., Rajarshi Pal, and S. R. Balasundaram. "Two-factor-based RSA key generation from fingerprint biometrics and password for secure communication." Complex & Intelligent Systems 8.4 (2022): 3247-3261. (Year: 2022).*

B. Yan and L. You, "A novel public key encryption model based on transformed biometrics," 2017 IEEE Conference on Dependable and Secure Computing, Taipei, Taiwan, 2017, pp. 424-428, doi: 10.1109/DESEC.2017.8073861. (Year: 2017).*

Non-Final Office Action (NFOA) for U.S. Appl. No. 17/847,758 mailed Mar. 25, 2024 (12 pages).

Aimeur, Esama, Gilles Brassard, and Flavien Serge Mani Onana. "Secure anonymous physical delivery." IADIS International Journal on WWW/Internet, vol. 4, No. 1, (2006), pp. 56-69. (Year: 2006).

R. Aitawy, M. Elsheikh, A.M. Youssef and G. Gong, "Lelantos: A Blockchain-Based Anonymous Physical Delivery System", 2017 15th Annual Conference on Privacy, Security and Trust (PST), Calgary, AB, Canada, 2017, pp. 15-1509, doi: 10.1109/PST.2017.00013. (Year 2017).

Androulaki, Elli, and Steven Bellovin. "Apod: Anonymous physical object delivery." International Symposium on Privacy Enhancing Technologies Symposium, Berlin, Heidelberg: Springer Berlin Heidelberg, 2009. (Year: 2009).

Quyang, Ju, and Xianping Chen. "Personal Information Two-dimensional Code Encryption Technology in the Process of E-commerce Logistics Transportation." SAIEE Africa Research Journal 113.1 (2022): 52-57. (Year: 2022).

X. Zhang, H. Li, Y. Yang, G Sun and G. Chen, "LIPPS: Logistics Information Privacy Protection System Based on Encrypted QR Code," 2016 IEEE Trustcom/BigDataSE/ISPA, Tianjin, China, 2016, pp. 996-1000, doi: 10.1109/TrustCom.2016.0167. (Year: 2016).

Notice of Allowance (NOA) for U.S. Appl. No. 17/847,758, mailed May 31, 2024 (9 pages).

Corrected Notice of Allowance for U.S. Appl. No. 17/847,758, mailed Jun. 14, 2024 (5 pages).

* cited by examiner

SYSTEM AND METHOD FOR GRANTING ROLE-BASED ACCESS TO A DIGITAL ARTIFACT

CROSS-REFERENCE TO RELATED APPLICATIONS AND PRIORITY

The present application claims priority from U.S. Provisional Application No. 63/295,812 filed on Dec. 31, 2021, entitled "SYSTEM AND METHOD OF AUTHENTICATING A DEPICTION OF A PERSON ONLINE."

TECHNICAL FIELD

The present subject matter described herein, in general, relates to authentication of documents. More specifically, the present subject matter discloses a system and method for authenticating a document to be uploaded on a client application.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

As the internet has matured over the decades, the number of people online has increased exponentially. Booming social networks and marketplaces present many cases for people to be represented online. When a person is represented on a network, such as a social media network, the person can be anonymous, pseudonymous, or personally identifiable. Although there are some cases in which a person needs to be identified, in vast majority of cases, even when the person's identity is anonymized, the network needs to authenticate and match the person with an existing user, for the network to facilitate meaningful interactions between various entities on the network.

In case of personally non-identifiable identity expression, a person is uniquely depicted online in applications where they are not personally identifiable. The application identifies the users using two common methods. The first method, designed for systems, uses a system-generated unique identification number, commonly known as the "UID" to represent a person. The second method, designed for people, uses a user-generated string, commonly known as the "username". The use of UIDs and usernames are limited to a specific application/network and therefore they are only unique within that application. In another application, the same UID or username may be used to represent a totally different person. Thus, every application is a silo and people are unable to carry their identities seamlessly across different applications.

In case of personally identifiable identity expression, a person is uniquely depicted online in applications where the person is personally identifiable. Such applications typically require users to register with an email or a phone number. Once the user is registered, for every subsequent session, the application authenticates the person using the person's email address or phone number, and a password. The application uses the user's email address or phone number to map the current user with a registered user. On applications that require physical-world identity verification, a new registrant is required to provide a government-issued document such as a driver's license, national identity card, passport, or a similar acceptable document. Sometimes applications even directly use a government-issued identifier such as a social security number or driver's license number to uniquely represent the person within the application experience.

All the above practices suffer from critical shortcomings such as:
  The identifier is unique only within a specific application
  The identifier may be issued by an agency using questionable standards
  The identifier may not always be anonymized for client application developers
  The identifier may not be traversable across multiple applications.

Thus, there is a long-felt need for a system and method for rendering an authenticated unique visual depiction of a person, where the depiction has all the following qualities:
  The identifier is unique across the internet
  The identifier is self-issued by the user not dependent on any third party
  The identifier can be anonymized for client application developers
  The identifier is traversable across multiple applications.

SUMMARY

This summary is provided to introduce concepts related to a system and a method for granting role-based access to a digital artifact, and the concepts are further described below in the detailed description. This summary is not intended to identify essential features of the claimed subject matter nor is it intended for use in determining or limiting the scope of the claimed subject matter.

In one implementation, a system for affixing one or more users and their corresponding roles to a digital artifact (A1), rendering the digital artifact (A1) in a client application (C1), and provisioning the one or more users with role-based access to the digital artifact (A1) is described. The system comprises a memory and a processor coupled to the memory. The processor is configured to execute programmed instructions stored in the memory for registering a set of users by. Each user from the set of users is registered by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), and storing the Unique-Number (N1) and the Public-Key (P1) in a database. The processor is further configured to execute programmed instructions stored in the memory for affixing one or more users and one or more roles associated with each user from the one or more users to a digital artifact (A1). For the purpose of affixing, the processor is configured to execute programmed instructions stored in the memory for receiving an instruction to create the digital artifact (A1), wherein the digital artifact (A1) is created in a client application (C1), receiving an instruction to assign one or more roles from a set of roles (R1-Rn) to each user from the one or more users, encrypting a Unique-Number (N2) associated with each user from the one or more users to obtain an encrypted Unique-Number (N2) corresponding to each user from the one or more users, wherein the Unique-Number (N2) is encrypted using a Public-Key (P2) associated with each user from the one or more users, and immutably affixing the encrypted Unique-Number (N2) corresponding to each user from the one or more users into the digital artifact (A1) and the one or more roles associated with each user from the one or more users. The processor is further configured to execute programmed instructions stored in the memory for provisioning a target user (U1$_t$) with role-based access to the digital artifact (A1) by receiving from the target user (U1$_t$), a request R1, to perform in respect of the digital artifact (A1) a set of operations associated with a target role, receiving a target public key (P1$_t$) corresponding to the target user (U1$_t$), receiving a set of biometric samples of the target user (U1$_t$), corresponding to one or more biometric factors, processing the set of biometric samples to compute a target Secret-Key (S1$_t$) corresponding to the target user (U1$_t$), decrypting a target encrypted Unique-Number (N2$_t$) affixed in the digital artifact (A1), using the target Secret-Key (S1$_t$) and the target Public-Key (P1$_t$) to obtain a Target Unique-Number (N1$_t$) corresponding to the target user (U1$_t$), obtain one or more roles corresponding to the Target Unique-Number (N1$_t$), and provisioning the target user (U1$_t$) to grant permission to perform a set of operations on the digital artifact (A1) based on the one or more roles corresponding to the target user.

In another implementation, a method of affixing one or more users and their corresponding roles to a digital artifact (A1), rendering the digital artifact (A1) in a client application (C1), and provisioning the one or more users with role-based access to the digital artifact (A1), is illustrated. The method comprises steps of registering a set of users by. Each user from the set of users is registered by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), and storing the Public-Key (P1) in a database. The method further comprises affixing one or more users and one or more roles associated with each user from the one or more users to a digital artifact (A1). The process of affixing comprises steps of receiving an instruction to create the digital artifact (A1), wherein the digital artifact (A1) is created in a client application (C1), receiving an instruction to assign one or more roles from a set of roles (R1-Rn) to each user from the one or more users, encrypting a Unique-Number (N2) associated with each user from the one or more users to obtain an encrypted Unique-Number (N2) corresponding to each user from the one or more users, wherein the Unique-Number (N2) is encrypted using a Public-Key (P2) associated with each user from the one or more users, and embedding the encrypted Unique-Number (N2) corresponding to each user from the one or more users into the digital artifact (A1) and the one or more roles associated with each user from the one or more users. Further, the method comprises steps of provisioning a target user (U1$_t$) with role-based access to the digital artifact (A1) by receiving from the target user (U1$_t$), a request R1, to perform in respect of the digital artifact (A1) a set of operations associated with a target role, receiving a target public key (P1$_t$) corresponding to the target user (U1$_t$), receiving a set of biometric samples of the target user (U1$_t$), corresponding to one or more biometric factors, processing the set of biometric samples to compute a target Secret-Key (S1$_t$) corresponding to the target user (U1$_t$), decrypting a target encrypted Unique-Number (N2$_t$) affixed in the digital artefact (A1), using the target Secret-Key (S1$_t$) and the target Public-Key (P1$_t$) to obtain a Target Unique-Number (N1$_t$) corresponding to the target user (U1$_t$), obtain one or more roles corresponding to the Target Unique-Number (N1$_t$), and provisioning the target user (U1$_t$) to grant permission to perform a set of operations on the digital artifact (A1) based on the one or more roles corresponding to the target user.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments." "in some embodiments," "in one embodiment." or "in an embodiment" in places throughout the specification are not necessarily all referring to the same embodiment. Furthermore, the particular features, structures or characteristics may be combined in any suitable manner in one or more embodiments.

Figure 1:
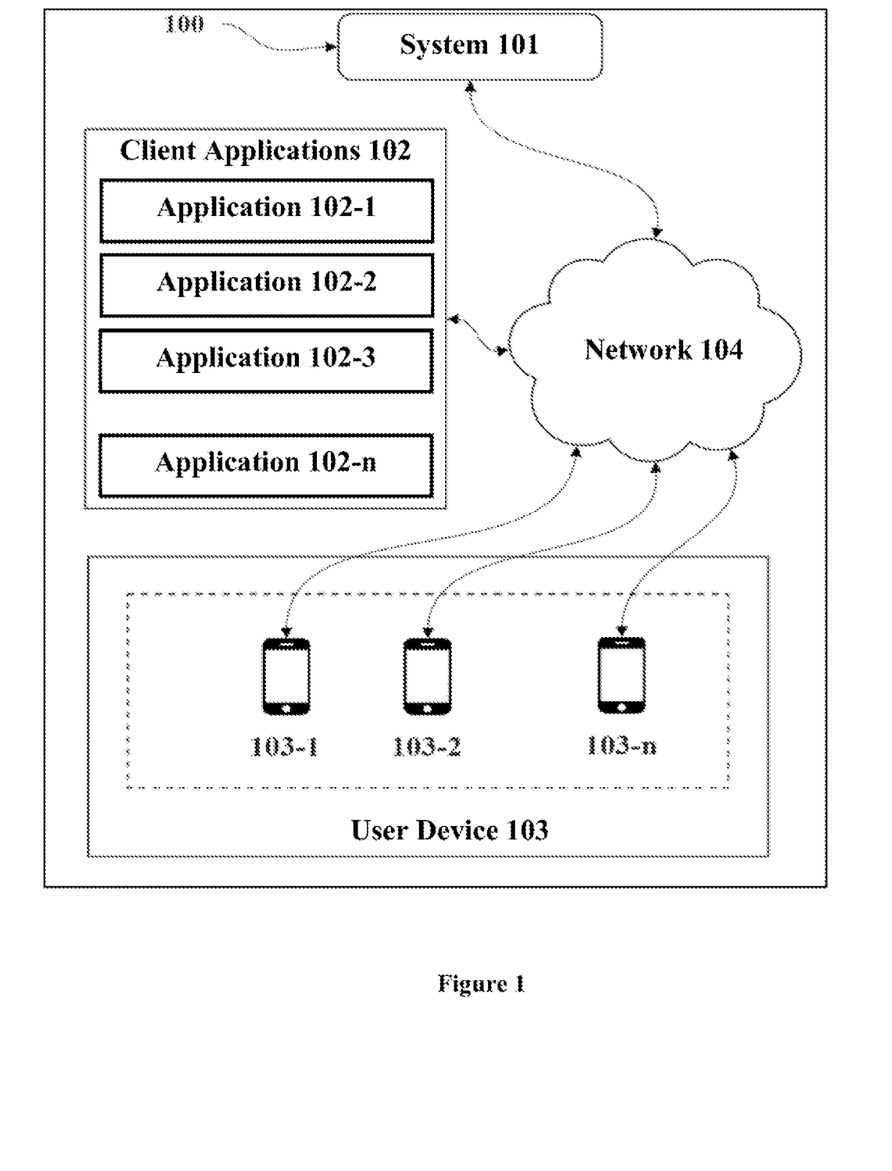
FIG. 1 illustrates a network implementation 100 of a system 101 for granting role-based access to a digital artifact, in accordance with an embodiment of the present disclosure.

Referring to FIG. 1, implementation 100 of a system 101 for granting role-based access to a digital artifact is illustrated, in accordance with an embodiment of the present subject matter. In one embodiment, the system 101 may comprise a processor and a memory. Further, the system 101 may be connected to user devices and client applications through a network 104. It may be understood that the system 101 may be connected with multiple users through one or more user devices 103-1, 103-2, 103-3 . . . , 103-n and applications 102-1, 102-2, 102-3 . . . , 102-n collectively referred to as a user device 103 and client applications 102 respectively. The client applications 102 may correspond to any one of online platforms, social media networks and other online service providers. It must be noted that the users may use the user devices 103 to register themselves with the client applications 102. The client application 102 may allow the users to create digital artifacts in the client application 102. Before creating any digital artifact in the client application 102, the system 101 is configured to authenticate a user. The digital artifact may be a text file, a media file, a website, or any other set of one or more digital files. The media file may be any one of an image file, video tile, VR file, an audio file and the like. The file may be any one of an editable file, or a non-editable file. The digital artifact may also correspond to a physical object such as a house or a car.

In one embodiment, the user device 103 may be a dedicated electronic equipment assigned to a user. The user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. Furthermore, the user devices 103 are also enabled to communicate with a distributed global people's registry. The Distributed Global People Registry may be an autonomous free public utility that stores the public-key of every registered stakeholder of each client application 102.

In one embodiment, the client application 102 may be any internet-based application which requires user authentication before providing the user with access to the client application 102 for creating the digital artifact. The system 101 for granting role-based access to a digital artifact is further illustrated with the block diagram in FIG. 2.

Figure 2:
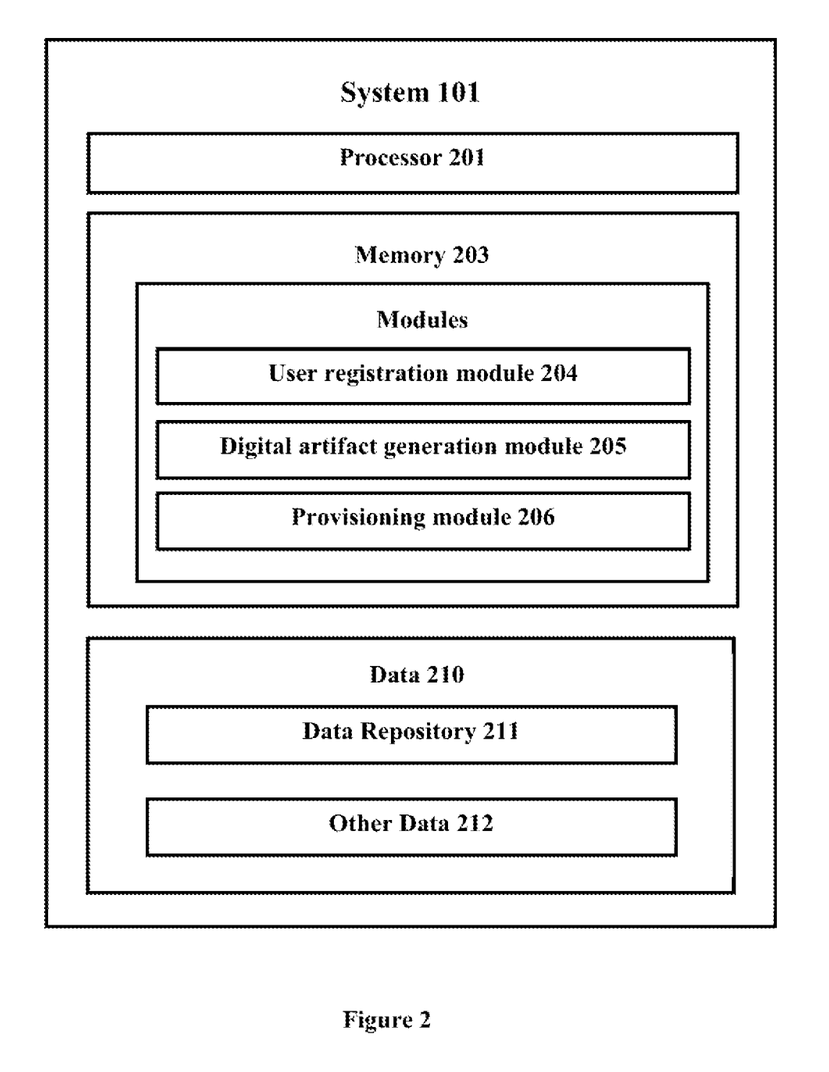
FIG. 2 illustrates components of the system 101 for granting role-based access to a digital artifact, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory 203 consists of a set of modules. The set of modules may include a user registration module 204, a digital artifact generation module 205, a provisioning module 206. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards. The memory 203 may be configured to store the programmed instructions to be executed by the processor 201.

In one embodiment, the programmed instructions may include routines, programs, objects, components, data structures, etc., which perform particular tasks, functions, or implement particular abstract data types. The data 210 may comprise a data repository 211, and other data 212. The other data 212 amongst other things, serves as a repository for storing data processed, received, and generated by one or more components and programmed instructions.

In one embodiment, the processor 201 may be configured to execute programmed instructions corresponding to the user registration module 204. The user registration module 204 may be configured to register each user from a set of users. For each user from the set of users, the user registration module 204 may be configured to receive a set of biometric samples of the user, corresponding to one or more biometric factors. The set of biometric samples may correspond to the face, fingerprint, retina, or any other biometric sample of the user. The set of biometric samples may be captured in real-time. It must be noted that there are minor variations in the biometric sample of the user, for instance the face sample may vary depending on the time of the day, mental state of the user, weight gained or lost by the user and other characteristics. Also, the biometric samples may change over time due to aging. To address this problem, the set of biometric samples are quantized, before applying a key generation algorithm to the set of biometric samples, to generate a Secret Key (S1) corresponding to each user from the set of users.

In one embodiment, the set of biometric samples of the user are captured using a biometric data capturing device. The biometric data capturing device is at least one of one of a camera, a fingerprint scanner, a retina scanner, and the like. It must be noted that the set of biometric samples is captured from the user in real-time. During the process of capturing the set of biometric samples, a liveness detection test is also performed.

Further, the user registration module 204 may be configured to process the set of biometric samples and compute the Secret-Key (S1) corresponding to the user.

Further, the user registration module 204 may be configured to generate a Unique-Number (N1) using a random number generation algorithm. Further, the user registration module 204 may be configured to apply a Function (F1) to the Secret-Key (S1) and the Unique-Number (N1) to compute a Public-Key (P1). Finally, the user registration module 204 may be configured to store the Public-Key (P1) in a database. In a similar manner, the database is updated to store the Public-Key (P1) corresponding to each user from the set of users. The database may be maintained over a peer-to-peer network.

In one embodiment, once the user registration is complete, the processor 201 may be configured to execute programmed instructions corresponding to the digital artifact generation module 205. The digital artifact generation module 205 may be configured for affixing one or more users and one or more roles associated with each user from the one or more users to a digital artifact (A1). For this purpose, the digital artifact generation module 205 may be configured to receive an instruction to create the digital artifact (A1). The digital artifact (A1) is created in a client application (C1). The client application may run on a local device or on a network. The digital artifact (A1) may be a text file, a media file, a website or any other set of one or more digital files. The media file may be any one of an image file, video file, VR file, an audio file and the like. The file may be any one of an editable file, or a non-editable file. The digital artifact (A1) may also correspond to a physical object such as a house or a car.

Further, the digital artifact generation module 205 may be configured to receive an instruction to assign the one or more roles from a set of roles (R1-Rn) to each user from the one or more users. Further, the digital artifact generation module 205 may be configured to encrypt a Unique-Number (N2) associated with each user from the one or more users to obtain an encrypted Unique-Number (N2) corresponding to each user from the one or more users. The Unique-Number (N2) may be encrypted using a Public-Key (P2) associated with each user from the one or more users. Further, the digital artifact generation module 205 may be configured to immutably affix the encrypted Unique-Number (N2) corresponding to each user from the one or more users into the digital artifact (A1) and the one or more roles associated with each user from the one or more users thereby integrating the one or more users and one or more roles into a digital artifact (A1).

In one embodiment, the processor 201 may be configured to execute programmed instructions corresponding to the provisioning module 206. The provisioning module 206 may be configured for provisioning a target user ($U1_t$) with role-based access to the digital artifact (A1). For this purpose, the provisioning module 206 may be configured to receive from the target user ($U1_t$), a request R1, to perform in respect of the digital artifact (A1) a set of operations associated with a target role. Further, the provisioning module 206 may be configured to receive a target public key ($P1_t$) corresponding to the target user ($U1_t$). Further, the provisioning module 206 may be configured to receive a set of biometric samples of the target user ($U1_t$), corresponding to one or more biometric factors. Further, the provisioning module 206 may be configured to process the set of biometric samples to compute a target Secret-Key ($S1_t$) corresponding to the target user ($U1_t$).

Once the target Secret-Key ($S1_t$) is generated, the provisioning module 206 may be configured to decrypt a target encrypted Unique-Number ($N2_t$), immutably affixed in the digital artifact (A1), using the target Secret-Key ($S1_t$) and the target Public-Key ($P1_t$) to obtain a Target Unique-Number ($N1_t$).

Further, the provisioning module 206 may be configured to obtain one or more roles corresponding to the Target Unique-Number ($N1_t$). Further, the provisioning module 206 may be configured to provision the target user ($U1_t$) to perform in respect of the digital artifact (A1) a set of operations associated with the target role. If the target encrypted Unique-Number ($N2_t$) is not decrypted using the target Secret-Key ($S1_t$), the provisioning module 206 restricts the target user ($U1_t$) from performing, in respect of the digital artifact (A1), a set of operations associated with the target role.

Figure 3:
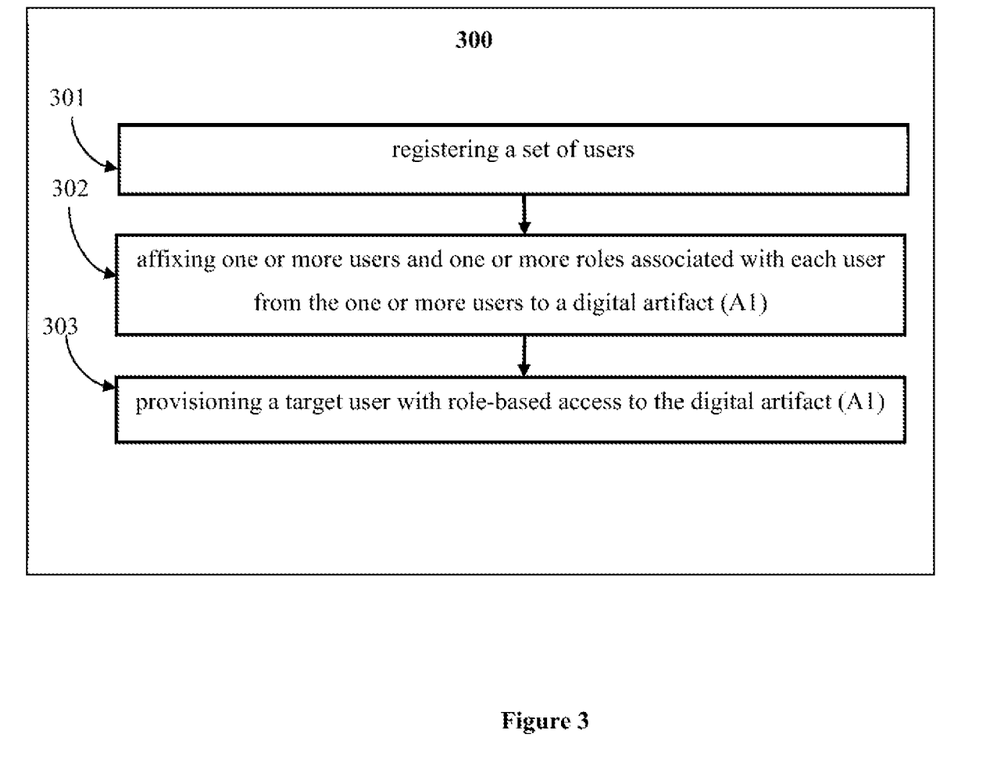
FIG. 3 illustrates a method 300 for granting role-based access to a digital artifact, in accordance with an embodiment of the present disclosure.

Now referring to FIGS. 3, a method of affixing one or more users and their corresponding roles to a digital artifact (A1), rendering the digital artifact (A1) in a client application (C1), and provisioning the one or more users with role-based access to the digital artifact (A1) is illustrated in accordance with an embodiment of the present invention.

At step 301, the user registration module 204 may be configured to register a set of users. The detailed process of registering a set of users is further elaborated with respect to FIG. 4.

At step 302, the digital artifact generation module 205 may be configured for affixing one or more users and one or more roles associated with each user from the one or more users to a digital artifact (A1). The detailed process of affixing one or more users and one or more roles associated with each user from the one or more users to a digital artifact (A1) is further elaborated with respect to FIG. 5.

At step 303, the provisioning module 206 may be configured for provisioning a target user ($U1_t$) with role-based access to the digital artifact (A1). The detailed process of provisioning a target user ($U1_t$) with role-based access to the digital artifact (A1) is further elaborated with respect to FIG. 6.

Figure 4:
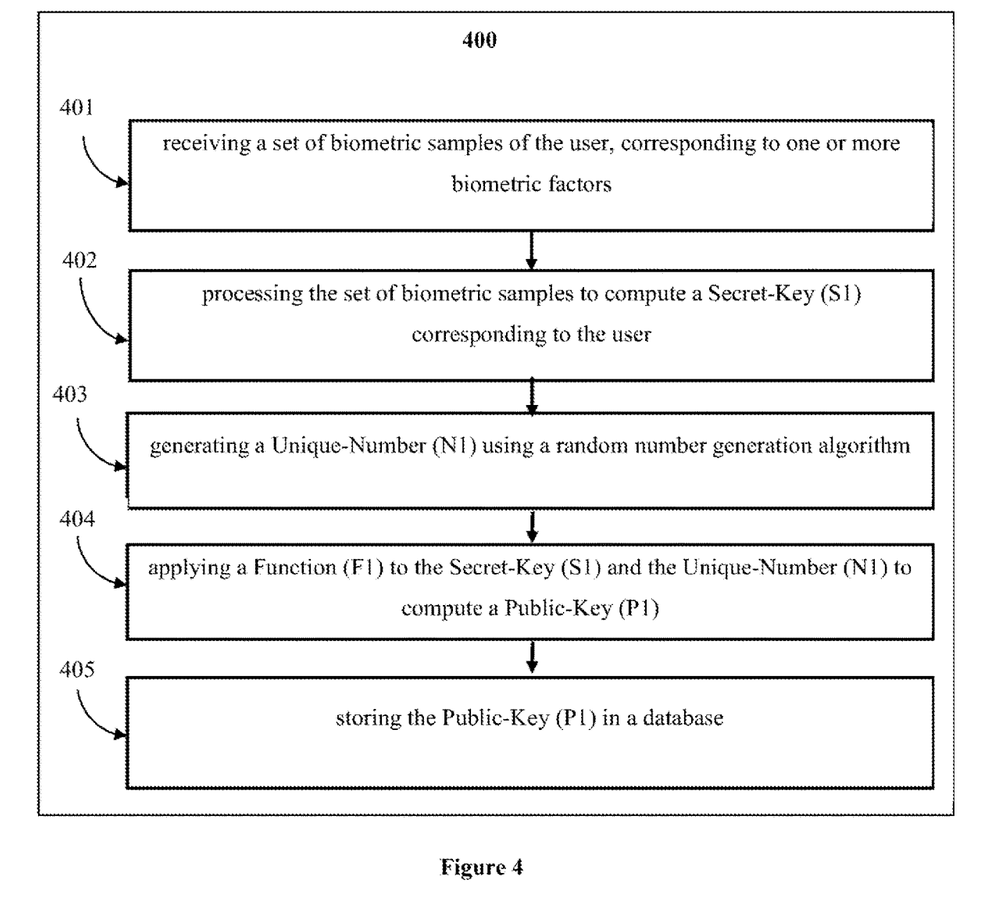
FIG. 4 illustrates a method 400 for registering a set of users, in accordance with an embodiment of the present disclosure.

Now referring to FIG. 4, the process to register each user from a set of users is illustrated, in accordance with an embodiment of the present invention.

At step 401, for each user from the set of users, the user registration module 204 may be configured to receive a set of biometric samples of the user, corresponding to one or more biometric factors. The set of biometric samples may correspond to the face, fingerprint, retina, or any other biometric sample of the user. The set of biometric samples may be captured in real-time. It must be noted that there are minor variations in the biometric sample of the user, for instance the face sample may vary depending on the time of the day, mental state of the user, weight gained or lost by the user and other characteristics. Also, the biometric samples may change over time due to aging. To address this problem, the set of biometric samples are quantized, before applying a key generation algorithm to the set of biometric samples, to generate the Secret Key (S1) corresponding to each user from the set of users.

In one embodiment, the set of biometric samples of the user are captured using a biometric data capturing device. The biometric data capturing device is at least one of one of a camera, a fingerprint scanner, and a retina scanner, and the like. It must be noted that the set of biometric samples is captured from the user in real-time. During the process of capturing the set of biometric samples, a liveness detection test is also performed.

At step 402, the user registration module 204 may be configured to process the set of biometric samples and compute the Secret-Key (S1) corresponding to the user.

At step 403, the user registration module 204 may be configured to generate a Unique-Number (N1) using a random number generation algorithm.

At step 404, the user registration module 204 may be configured to apply a Function (F1) to the Secret-Key (S1) and the Unique-Number (N1) to compute a Public-Key (P1).

At step 405, finally the user registration module 204 may be configured to store the Public-Key (P1) in a database. In a similar manner, the database is updated to store the Public-Key (P1) corresponding to each user from the set of users. The database may be maintained over a peer-to-peer network. Further, the process of affixing one or more users and one or more roles is further elaborated with respect to the flowchart of FIG. 5.

Figure 5:
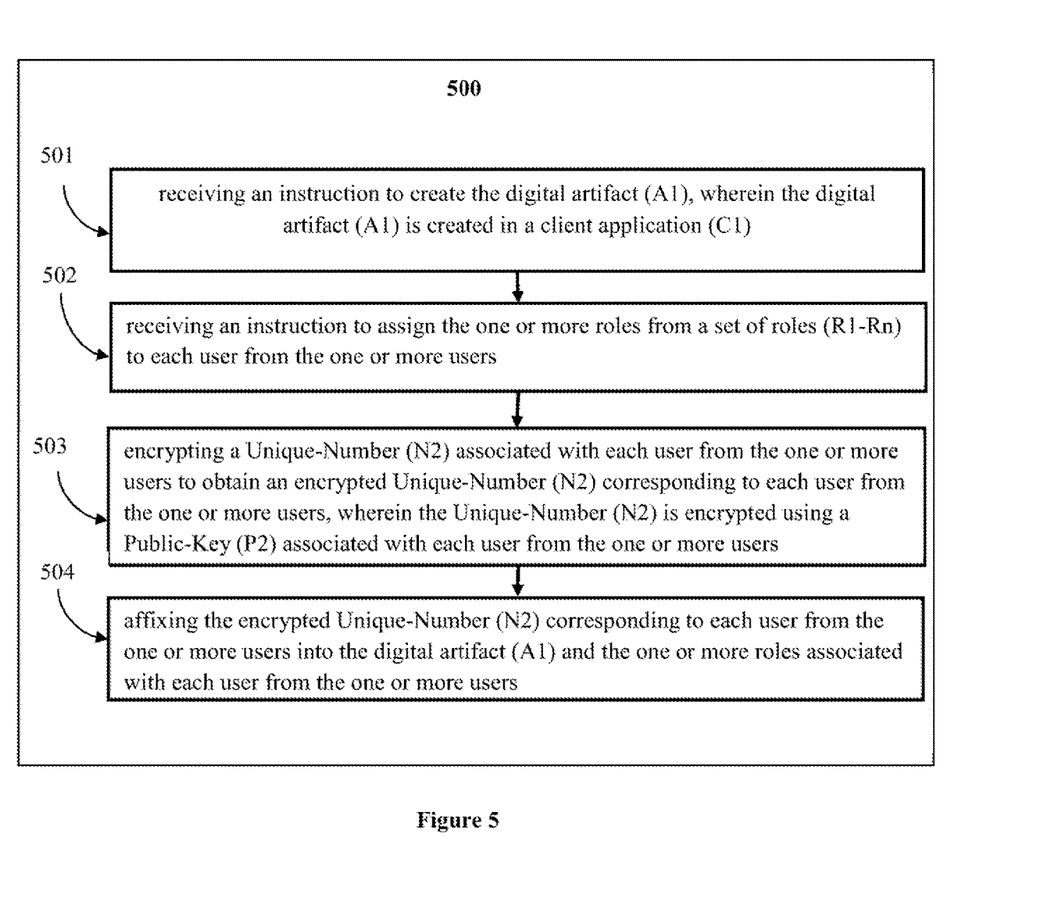
FIG. 5 illustrates a method 500 for affixing one or more users and one or more roles associated with each user from the one or more users to a digital artefact (A1), in accordance with an embodiment of the present disclosure.

Referring now to FIG. 5, the process of affixing one or more users and one or more roles associated with each user from the one or more users to a digital artifact (A1) is illustrated, in accordance with an embodiment of the present invention.

At step 501, the digital artifact generation module 205 may be configured to receive an instruction to create the digital artifact (A1). The digital artifact (A1) is created in a client application (C1). The client application may be any desktop or mobile application. The client application (C1) may run on a local device or on a network.

At step 502, the digital artifact generation module 205 may be configured to receive an instruction to assign the one or more roles from a set of roles (R1-Rn) to each user from the one or more users.

At step 503, the digital artifact generation module 205 may be configured to encrypt a Unique-Number (N2) associated with each user from the one or more users to obtain an encrypted Unique-Number (N2) corresponding to each user from the one or more users. The Unique-Number (N2)

may be encrypted using a Public-Key (P2) associated with each user from the one or more users.

At step 504, the digital artifact generation module 205 may be configured to embed the encrypted Unique-Number (N2) corresponding to each user from the one or more users into the digital artifact (A1) and the one or more roles associated with each user from the one or more users thereby affixing one or more users and one or more roles associated with each user from the one or more users to a digital artifact (A1).

Figure 6:
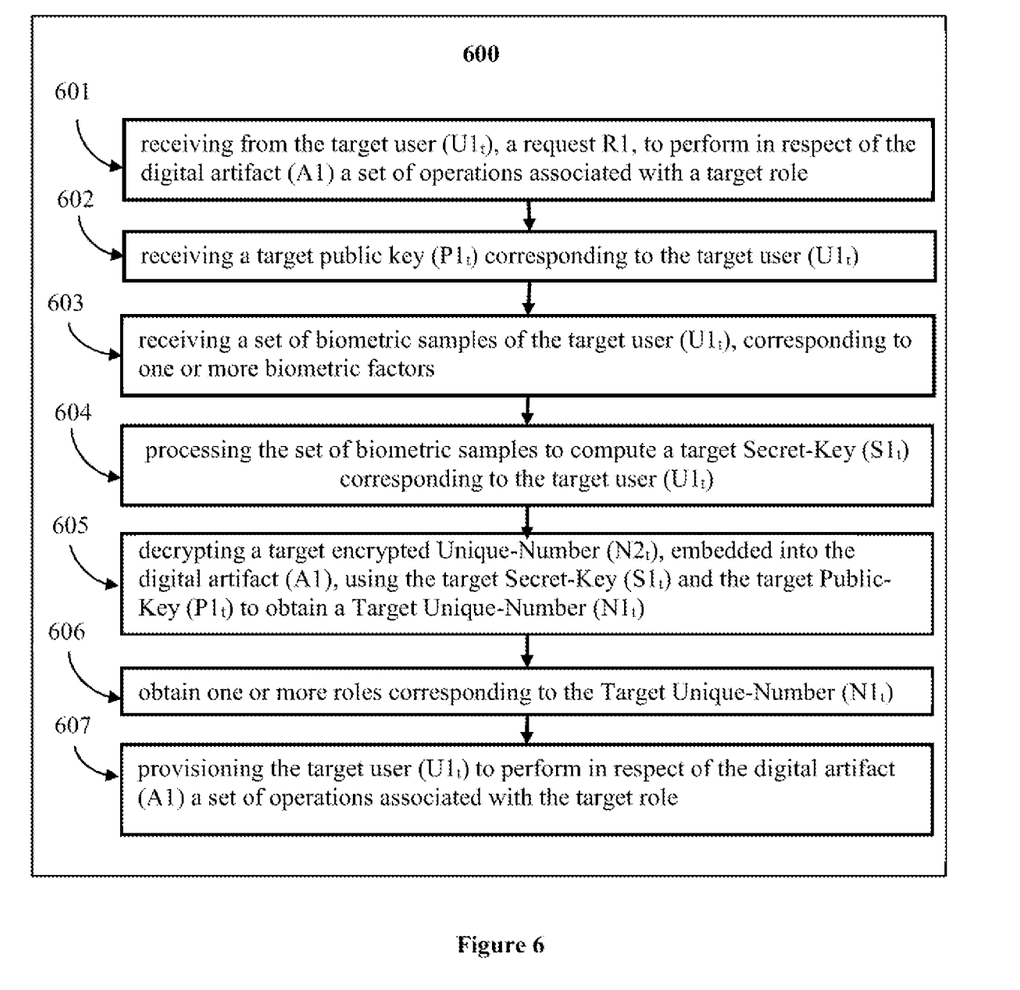
FIG. 6 illustrates a method 600 for provisioning a target user (U1$_t$) with role-based access to the digital artifact (A1), in accordance with an embodiment of the present disclosure.

Referring now to FIG. 6, the process 600 of provisioning a target user (U1$_t$) with role-based access to the digital artifact (A1) is illustrated in accordance with an embodiment of the present invention.

At step 601, the provisioning module 206 may be configured to receive from the target user (U1$_t$), a request R1, to perform in respect of the digital artifact (A1) a set of operations associated with a target role.

At step 602, the provisioning module 206 may be configured to receive a target public key (P1$_t$) corresponding to the target user (U1$_t$).

At step 603, the provisioning module 206 may be configured to receive a set of biometric samples of the target user (U1$_t$), corresponding to one or more biometric factors.

At step 604, the provisioning module 206 may be configured to process the set of biometric samples to compute a target Secret-Key (S1$_t$) corresponding to the target user (U1$_t$).

At step 605, the provisioning module 206 may be configured to decrypt a target encrypted Unique-Number (N2$_t$), embedded into the digital artifact (A1), using the target Secret-Key (S1$_t$) and the target Public-Key (P1$_t$) to obtain the Target Unique-Number (N1$_t$)

At step 606, the provisioning module 206 may be configured to obtain one or more roles corresponding to the Target Unique-Number (N1$_t$).

At step 607, the provisioning module 206 may be configured to provision the target user (U1$_t$) to perform in respect of the digital artifact (A1) a set of operations associated with the target role.

In one example, after the target user (U1$_t$) and other users are registered with the system 101, the system may be configured to immutably affixing one or more Unique-Numbers (N1-Nn) associated with one or more users and one or more roles (R1-Rn) associated with each user from the one or more users to a digital artifact (A1).

In one example, the digital artifact (A1) may be a document D1. The document D1 may be an editable text tile to be uploaded to the client application C. The one or more roles associated with the document D1 may comprise viewer role, reviewer role, editor role, and the like. The process of assigning the one or more roles to the document D1 may be as described in FIG. 5. Further, the system 101 may be configured to provision the target user (U1$_t$) with role-based access to the document D1. For this purpose, a request R1 may be received from the target user (U1$_t$). The request R1 may be associated with a target role. The target role may correspond to the editor of the document D1. Before granting the target user (U1$_t$) the permission to edit the document D1, the target user (U1$_t$) and her role may be validated using the process as described in FIG. 6.

In another example, the digital artifact (A1) may be a post P1 to be published on a website W1. The website W1 may be a publicly accessible social media platform. The one or more roles associated with the post P1 may comprise viewer, commenter, sharer, and the like. The process of assigning the one or more roles to the post P1 may be as described in FIG. 5. Further, the system 101 may be configured to provision the target user (U1$_t$) with role-based access to the post P1. For this purpose, a request R1 may be received from the target user (U1$_t$). The request R1 may be associated with a target role. The target role may correspond to the resharing of the post P1. Before granting the target user (U1$_t$) the permission to reshare the post P1, the target user (U1$_t$) and her role may be validated using the process as described in FIG. 6.

In yet another example, the digital artifact (A1) may be an access control application A1 running in a smart car. The one or more roles associated with the access control application A1 may comprise accessing the smart car, driving the smart car within a predefined geographic region, valet-parking the car, accessing the storage space of the smart car, and the like. The process of assigning the one or more roles to the access control application A1 may be as described in FIG. 5. Further, the system 101 may be configured to provision the target user (U1$_t$) with role-based access to the access control application A1 for accessing the smart car. For this purpose, a request R1 may be received from the target user (U1$_t$). The request R1 may be associated with a target role. The target role may correspond to valet-parking the smart car. Before granting the target user (U1$_t$) the permission to valet-park the smart car, the target user (U1$_t$) and her role may be validated using the process as described in FIG. 6.

In yet another example, the digital artifact (A1) may be an access control application A1 associated with a home security system. The one or more roles associated with the access control application A1 may comprise a homestay guest, a housekeeping crew member, and the like. The process of assigning the one or more roles to the access control application A1 may be as described in FIG. 5. Further, the system 101 may be configured to provision the target user (U1$_t$) with role-based access to the access control application A1 for accessing the house. For this purpose, a request R1 may be received from the target user (U1$_t$). The request R1 may be associated with a target role. The target role may correspond to homestay guests. Before granting the target user (U1$_t$) the permission to enter the house, the target user (U1$_t$) and her role may be validated using the process as described in FIG. 6.

Although implementations for the system 101 for immutably affixing one or more Unique-Numbers (N1-Nn) associated with one or more users and one or more roles (R1-Rn) associated with each user from the one or more users to a digital artifact (A1), rendering the digital artifact (A1) in a client application (C1), and provisioning the one or more users with role-based access to the digital artifact (A1) have been described in language specific to structural features and methods, it must be understood that the claims are not limited to the specific features or methods described. Rather, the specific features and methods are disclosed as examples of implementations for the system 101 and the method 300 for immutably affixing one or more Unique-Numbers (N1-Nn) associated with one or more users and one or more roles (R1-Rn) associated with each user from the one or more users to a digital artifact (A1), rendering the digital artifact (A1) in a client application (C1), and provisioning the one or more users with role-based access to the digital artifact (A1).

The invention claimed is:

1. A method of affixing one or more users and their corresponding roles to a digital artifact (A1), rendering the digital artifact (A1) in a client application (C1), and provisioning the one or more users with role-based access to the digital artifact (A1), the method comprising steps of:

registering a set of users by, wherein each user from the set of users is registered by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), and storing the Public-Key (P1) in a database;

affixing one or more users and one or more roles associated with each user from the one or more users to a digital artifact (A1) by receiving an instruction to create the digital artifact (A1), wherein the digital artifact (A1) is created in a client application (C1), receiving an instruction to assign the one or more roles from a set of roles (R1-Rn) to each user from the one or more users, encrypting a Unique-Number (N2) associated with each user from the one or more users to obtain an encrypted Unique-Number (N2) corresponding to each user from the one or more users, wherein the Unique-Number (N2) is encrypted using a Public-Key (P2) associated with each user from the one or more users, and embedding the encrypted Unique-Number (N2) corresponding to each user from the one or more users into the digital artifact (A1) and the one or more roles associated with each user from the one or more users;

provisioning a target user ($U1_t$) with role-based access to the digital artifact (A1) by receiving from the target user ($U1_t$), a request R1, to perform in respect of the digital artifact (A1) a set of operations associated with a target role, receiving a target public key ($P1_t$) corresponding to the target user ($U1_t$), receiving a set of biometric samples of the target user ($U1_t$), corresponding to one or more biometric factors, processing the set of biometric samples to compute a target Secret-Key ($S1_t$) corresponding to the target user ($U1_t$), decrypting a target encrypted Unique-Number ($N2_t$) embedded into the digital artifact (A1), using the target Secret-Key ($S1_t$) and the target Public-Key ($P1_t$) to obtain a Target Unique-Number ($N1_t$), obtaining one or more roles corresponding to the target user ($U1_t$) based on the Target Unique-Number ($N1_t$), and provisioning the target user ($U1_t$) to perform in respect of the digital artifact (A1) a set of operations associated with the target role.

2. The method as claimed in claim 1, wherein the set of biometric samples correspond to the face of the target user ($U1_t$), wherein the set of biometric samples is captured in real-time at the time of registering the users, and wherein the set of biometric samples are quantized, before applying a key generation algorithm on the set of biometric samples, for generating the Secret Key (S1) corresponding to each user from the set of users.

3. The method as claimed in claim 1, wherein the digital artifact (A1) is a text file, a media file, a website or a set of digital files, wherein the media file may be any one of an image file, video file, VR file, or an audio file, wherein the file may be any one of an editable file, or a non-editable file, wherein the digital artifact (A1) corresponds to a physical object including a house or a car.

4. The method as claimed in claim 1, wherein the set of biometric samples of the target user ($U1_t$) are captured using a biometric data capturing device, wherein the biometric data capturing device is at least one of one of a camera, a fingerprint scanner, and an eye retina scanner, wherein the set of biometric samples is captured from the target user ($U1_t$) in real-time.

5. The method as claimed in claim 1, wherein the database is updated to store the Public-Key (P1) corresponding to each user from the set of users.

6. The method as claimed in claim 1, wherein the database is maintained over a peer-to-peer network.

7. A system for affixing one or more users and their corresponding roles to a digital artifact (A1), rendering the digital artifact (A1) in a client application (C1), and provisioning the one or more users with role-based access to the digital artifact (A1), the system comprises:

a memory;

a processor coupled to the memory, wherein the processor is configured to execute programmed instructions stored in the memory for:

registering a set of users by, wherein each user from the set of users is registered by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), and storing the Public-Key (P1) in a database;

affixing one or more users and one or more roles associated with each user from the one or more users to a digital artifact (A1) by receiving an instruction to create the digital artifact (A1), wherein the digital artifact (A1) is created in a client application (C1), receiving an instruction to assign the one or more roles from a set of roles (R1-Rn) to each user from the one or more users, encrypting a Unique-Number (N2) associated with each user from the one or more users to obtain an encrypted Unique-Number (N2) corresponding to each user from the one or more users, wherein the Unique-Number (N2) is encrypted using a Public-Key (P2) associated with each user from the one or more users, and embedding the encrypted Unique-Number (N2) corresponding to each user from the one or more users into the digital artifact (A1) and the one or more roles associated with each user from the one or more users;

provisioning a target user ($U1_t$) with role-based access to the digital artifact (A1) by receiving from the target user ($U1_t$), a request R1, to perform in respect of the digital artifact (A1) a set of operations associated with a target role;

receiving a target public key ($P1_t$) corresponding to the target user ($U1_t$), receiving a set of biometric samples of the target user ($U1_t$), corresponding to one or more biometric factors, processing the set of biometric samples to compute a target Secret-Key ($S1_t$) corresponding to the target user ($U1_t$), decrypting a target encrypted Unique-Number ($N2_t$), embedded into the digital artifact (A1) using the target Secret-Key ($S1_t$) and the target Public-Key ($P1_t$) to obtain a Target Unique-Number ($N1_t$), obtaining one or more roles corresponding to the target user ($U1_t$) based on the Target Unique-Number ($N1_t$), and provisioning the target user ($U1_t$) to perform in respect of the digital artifact (A1) a set of operations associated with the target role.

8. The system as claimed in claim 7, wherein the set of biometric samples correspond to the face of the target user ($U1_t$), wherein the set of biometric samples is captured in real-time at the time of registering the users, and wherein the set of biometric samples are quantized, before applying a key generation algorithm on the set of biometric samples, for generating the Secret Key (S1) corresponding to each user from the set of users.

9. The system as claimed in claim 7, wherein the digital artifact (A1) is a text file, a media file, a website or a set of digital files, wherein the media file may be any one of an image file, video file, VR file, or an audio file, wherein the file may be any one of an editable file, or a non-editable file, wherein the digital artifact (A1) corresponds to a physical object including a house or a car.

10. The system as claimed in claim 7, wherein the set of biometric samples of the target user ($U1_t$) are captured using a biometric data capturing device, wherein the biometric data capturing device is at least one of a camera, a fingerprint scanner, and a retina scanner, wherein the set of biometric samples is captured from the target user ($U1_t$) in real-time.

11. The system as claimed in claim 7, wherein the database is updated to store the Public-Key (P1) corresponding to each user from the set of users.

12. The system as claimed in claim 11, wherein the database is maintained over a peer-to-peer network.

\* \* \* \* \*